Patented July 25, 1950

2,516,206

UNITED STATES PATENT OFFICE 2,516,206

PREPARATION OF SERUMS FOR THERAPEUTIC USE

Alfred Joseph Harms, London, England, assignor to Burroughs Wellcome & Co. (U.S.A.) Inc., New York, N. Y., a corporation of New York No Drawing. Application December 6, 1946, Serial No. 714,670. In Great Britain January 3, 1946

4 Claims. (Cl. 167—78)

This invention comprises improvements in and relating to the preparation of sera for therapeutic use.

Such sera are customarily prepared from antitoxic, antibacterial or anti-viral plasma or serum from the horse or other animal. Such plasma contains various types of proteins, namely fibrin, globulins and albumin. Serum contains both globulins and albumin. The desired antibody is associated with the globulins. To prepare sera which are concentrated and which have a reduced tendency to cause undesirable side reactions on injection it is desirable to remove substantially the whole of the inert fibrin and albumin fractions. This is customarily done by fractional precipitation of the proteins with ammonium sulphate, sodium chloride, sodium sulphate or other known protein precipitating salt. The fibrin is first precipitated and removed, then the desired globulins are precipitated and are removed from the albumin. Later they must be redissolved and purified.

Small amounts (0.3 to 0.5%) of phenol or cresol are frequently added to the refined sera for antiseptic and preservative purposes.

The object of my invention is to simplify the fractionation procedure above described and to make it possible to obtain in a convenient manner antibody sera of high activity and concentration and low liability to cause side reactions. A further object is to improve the colour and clarity of the sera.

I have found by research and experiment that if the phenol is present at the time of the fractional precipitation with ammonium sulphate or other protein precipitating salt and is also increased in amount beyond the quantities customarily added for preservative purposes, the order in which the protein fractions are precipitated is changed, in that the albumin as well as the fibrin is precipitated initially leaving a clear solution of the globulins.

My invention accordingly comprises a process for refining antibody sera by fractional precipitation with ammonium sulphate, sodium chloride, sodium sulphate or other known protein precipitating salt in which more than 0.5% by weight of a phenolic substance is present during the fractional precipitation step.

Naturally the amount of phenolic substance present must not be such as to affect injuriously the therapeutic properties of the antibody sera. Therefore the amount of phenol present should not normally exceed 2.5% and there are similar limits readily ascertainable by simple experiment to the amount of other phenolic substances which should be employed. For example, when o-cresol is the phenolic substance employed the upper limit which is desirable is approximately 1.5%.

In speaking of phenolic substances I mean compounds having at least one hydroxyl group directly attached to an aromatic nucleus and homologues and halogenated and sulphonated derivatives thereof. The preferred phenolic substances employed in accordance with my invention are phenol itself ($C_6H_5.OH$) and o-cresol. When these particular compounds are employed in conjunction with ammonium sulphate the preferred quantities present during the precipitation step are 2.0% in the case of phenol and 1.0% in the case of o-cresol, when horse plasma containing diphtheria or other antitoxin is the material being fractionated. Under the same conditions the ammonium sulphate concentration should be 6 to 12%, and preferably 10%.

I find that by a single precipitation with ammonium sulphate in the presence of a phenolic substance I am able to obtain a solution consisting almost entirely of beta and gamma globulins which have associated with them a very large proportion of the desired antibody. After dilution with an equal volume of water to prevent denaturation of the antibody protein a further precipitation with ammonium sulphate (12 to 20%) will separate these globulins from the solution, and the resulting precipitate can be separated and dialysed to give concentrated solutions of the antitoxic globulins. As the brown pigments normally associated with the albumin are also precipitated with it I can obtain almost colourless solutions of the globulins and these solutions also possess the valuable property of remaining clear over long periods, of a year or more.

The yield of antibody is approximately the same as with the known process, but my process is more convenient and the purity is higher. The absence of albumin from sera prepared by my new process (in distinction to its presence in sera prepared according to the previously known process) has been confirmed by electrophoretic analysis.

Since very much lower concentrations of ammonium sulphate than customary are necessary in the presence of, say, 1.0% o-cresol to precipitate the protein containing no antibody, this method can be used for concentrating antibacterial and anti-viral sera, for these antibodies tend to be associated with the lower globulin fractions. It has been found possible to apply this method successfully to sera prepared against the following organisms:

Influenza virus type A
*Bacillus proteus* OX19
*Hemophilus pertussis*
Bacillus of swine erysipelas Other similar compounds which behave in a manner comparable with phenol and o-cresol are: p-m-cresols, mixtures of o-, m- and p-cresols, o-chlorphenol and p-chlorphenol.

What I claim is:

1. A process of refining antibody sera by fractional precipitation with a protein precipitating salt in which there is present during the fractional precipitation step in aqueous solution a phenolic substance selected from the class consisting of phenol and cresols having a concentration significantly more than 0.5% but not over 2½% by weight in the case of phenol and a concentration significantly more than 0.5% but not over 1.5% by weight in the case of cresols.

2. A process set forth in the preceding claim in which the protein precipitating salt employed is ammonium sulphate present in a concentration of from 6 to 12% by weight.

3. A process for refining antibody sera by fractional precipitation with a protein precipitating salt in which there is present during the fractional precipitation step approximately 2.0% by weight of phenol.

4. A process for refining antibody sera by fractional precipitation with a protein precipitating salt in which there is present during the fractional precipitation step approximately 1.0% by weight of o-cresol.

ALFRED JOSEPH HARMS.

REFERENCES CITED

The following references are of record in the file of this patent:

UNITED STATES PATENTS

| Number | Name | Date |
|---|---|---|
| 2,123,198 | Parfentjev | July 12, 1938 |
| 2,161,861 | Gerlough | June 13, 1939 |

FOREIGN PATENTS

| Number | Country | Date |
|---|---|---|
| 266,341 | Great Britain | of 1927 |

OTHER REFERENCES

Cohn, in J. Am. Chem. Soc. 62, Dec. 1940, pages 3396–3400.